(12) United States Patent
Meyer et al.

(10) Patent No.: US 11,863,113 B2
(45) Date of Patent: Jan. 2, 2024

(54) METHOD FOR REDUCING REGENERATED ENERGY AND REVERSAL STRESS IN A RECIPROCATING LOAD POWERED BY AN ELECTRIC MOTOR BY MODULATING MOTOR SPEED USING A VARIABLE FREQUENCY DRIVE AND VARIABLE FREQUENCY DRIVE PROVIDED FOR PERFORMING THE METHOD

(71) Applicant: Danfoss Power Electronics A/S, Grästen (DK)

(72) Inventors: Steve Michael Meyer, Georgetown, TX (US); Per Maersk Jørgensen, Sønderborg (DK)

(73) Assignee: DANFOSS POWER ELECTRONICS A/S, Grasten (DK)

( * ) Notice: Subject to any disclaimer, the term of this patent is extended or adjusted under 35 U.S.C. 154(b) by 0 days.

(21) Appl. No.: 17/861,200

(22) Filed: Jul. 9, 2022

(65) Prior Publication Data

US 2023/0018979 A1    Jan. 19, 2023

(30) Foreign Application Priority Data

Jul. 13, 2021    (DE) .......................... 102021118075.9

(51) Int. Cl.
*H02P 9/04*    (2006.01)
*G05D 19/02*    (2006.01)

(52) U.S. Cl.
CPC ............... *H02P 9/04* (2013.01); *G05D 19/02* (2013.01)

(58) Field of Classification Search
CPC ................................. H02P 9/04; G05D 19/02
See application file for complete search history.

(56) References Cited

U.S. PATENT DOCUMENTS

| | | | |
|---|---|---|---|
| 6,414,455 B1 | 7/2002 | Watson | |
| 9,654,048 B2* | 5/2017 | West | H02P 1/022 |
| 2004/0062657 A1 | 4/2004 | Beck et al. | |
| 2004/0084179 A1 | 5/2004 | Watson et al. | |
| 2008/0188173 A1* | 8/2008 | Chen | F24F 11/77 454/239 |
| 2013/0151216 A1 | 6/2013 | Pakla et al. | |
| 2014/0043870 A1* | 2/2014 | Swamy | H02M 5/458 363/126 |
| 2016/0056750 A1* | 2/2016 | West | H02P 29/024 318/490 |
| 2016/0329854 A9* | 11/2016 | West | H02P 1/022 |
| 2021/0298195 A1* | 9/2021 | Barbour | G06F 1/181 |

\* cited by examiner

*Primary Examiner* — Tulsidas C Patel
*Assistant Examiner* — Thomas K Quigley
(74) *Attorney, Agent, or Firm* — McCormick, Paulding & Huber PLLC

(57) ABSTRACT

The present disclosure refers to a method for controlling the speed of a reciprocating load motor, wherein the motor speed is a function of two input variables, namely a user defined speed set-point and a load dependent input variable. According to the disclosure, the load dependent input variable is a function of the motor current. The disclosure also refers to a variable frequency drive for controlling the speed of a reciprocating load motor, wherein the drive is programmed to perform the presently described method.

10 Claims, 5 Drawing Sheets

METHOD FOR REDUCING REGENERATED ENERGY AND REVERSAL STRESS IN A RECIPROCATING LOAD POWERED BY AN ELECTRIC MOTOR BY MODULATING MOTOR SPEED USING A VARIABLE FREQUENCY DRIVE AND VARIABLE FREQUENCY DRIVE PROVIDED FOR PERFORMING THE METHOD

CROSS-REFERENCE TO RELATED APPLICATION

This application claims foreign priority benefits under U.S.C. § 119 from German Patent Application No. 102021118075.9 filed Jul. 13, 2021, the content of which is hereby incorporated by reference in its entirety.

TECHNICAL FIELD

The present invention refers to a method for controlling the speed of a motor driving a reciprocating load, wherein the speed of the motor is a function of two input variables, namely a user defined speed set-point and a load dependent input variable. According to the invention, the load dependent input variable is a function of the motor current. The invention also refers to a variable frequency drive for controlling the speed of a reciprocating load motor, wherein the converter is programmed to perform the presently described method.

BACKGROUND

It is known in the art to use electric motors for driving reciprocating loads, such as rod pumps for pumping oil. Reciprocating loads are mechanisms, which change direction of motion twice during a stroke of the device. The variation in the motor load may be such that the direction of energy flow between the driving motor and the reciprocating load is inverted, or regenerating, during parts of the stroke.

Hence, the reciprocating load requires a net energy input at some instances of the load cycle while generating energy at other instances of the load cycle. Braking resistors are commonly used to dissipate the return energy input from the load into the motor.

A problem arising from these circumstances is that the control architecture of the motor is rendered more complicated and more expensive.

The aim of the invention is to provide an improved method for controlling such motors, such that the generated energy is reduced and the variable drive architecture is simplified at the same time.

SUMMARY

This aim is achieved by the method according to claim 1 and a variable frequency drive according to claim 10.

According to claim 1, a method for controlling the motor speed of a reciprocating load motor is provided, wherein the speed of the motor is a function of two input variables, namely a user defined speed set-point and a load dependent input variable. According to the invention, the load dependent input variable is a function of the motor current.

The reciprocating load motor may be understood to be an electric motor for driving non-constant, in particular reciprocating loads, such as oil pumps. The speed of the motor is a set value determined by an external controller and communicated to a variable frequency drive.

The motor speed modulation thus performed by the variable frequency drive is a combined function of the user-defined speed setpoint and the load dependent input variable, which are used together to define the characteristics of the electric power supply provided to the motor.

The present invention makes it possible to minimise or eliminate the use of braking resistors that are commonly used when using a variable frequency drive to drive a reciprocating load.

Although the invention may be described with reference to the field of rod pumps, as used in the oil industry, the present invention may be applied in any reciprocating load, where a reduction in reverse stress is beneficial.

Since, according to the invention, the speed of the motor is modulated in proportion to the load as measured by the motor, the momentum of the mechanical system corresponding to the reciprocating load can be a minimised at the reversal points of a stroke of the reciprocating load.

Accordingly, the invention makes it possible to control the motor speed of a reciprocating load application while avoiding regenerative energy input from the reciprocating load into the motor.

By effectively utilising the energy required to accelerate the motor/pump application, the present invention alters the speed reference on top of the user setpoint in a way that the acceleration energy counteracts the regenerative energy from the reciprocating load. Similarly, but opposite, the invention also utilises the kinetic energy to counteract the motoring energy of the reciprocating load by decelerating when the reciprocating load is positively loaded. In so doing, the motor is kept in a motoring mode with less load variation and therefore brake resistors can be eliminated.

The motor speed reference is altered based on the measured motor current. By extracting the active current component of the measured motor current, an indirect measure of the motor load torque can be obtained. By removing the DC component of the active current component, applying proper filtering and amplification, a varying speed reference can be obtained, providing a speed correction reference, which modulates the set speed, reducing regenerated energy without impacting the user set speed.

According to the invention, a software-based solution can be provided which requires neither external or additional sensors, such as speed, position or torque sensors of any kind, nor external controllers with special programming. The main advantage is that regenerative energy seen by the drive is avoided and hence brake resistors are not needed.

Although alternative control solutions may be feasible, the present invention can be regarded as the simplest solution, which does not compromise the user set speed of the application.

In a preferred embodiment of the invention, a variable frequency drive for controlling motor speed is provided for performing the method. The method may be therefore carried out on a standard variable frequency drive, thereby facilitating the implementation of the invention.

In a particularly preferred embodiment of the invention, the method is implemented as a control algorithm in the variable frequency drive. The standard variable frequency drive therefore does not have to be modified on a hardware level, further facilitating the implementation of the invention.

In another preferred embodiment of the invention, motor torque is kept positive during a complete cycle of the reciprocating load.

In another preferred embodiment of the invention, the control algorithm uses only measured reciprocating load motor current value as input. The motor current is used for performing the load dependent speed control on top of the user speed setpoint. The motor current and the user speed setpoint may be the only variables used for performing the speed control of the motor.

In another preferred embodiment of the invention, the motor current is measured by at least one current sensor in the variable frequency drive.

In another preferred embodiment of the invention, the reciprocating load motor speed variation is proportional to the momentum accumulated in the load driven by the motor, in particular the momentum accumulated in a shaft, crankshaft and/or a gearbox.

In another preferred embodiment of the invention, reciprocating load motor torque is calculated from measured current flowing through the reciprocating load motor. In particular, the method may use the active current component of the measured current, said active current component being equivalent to the reciprocating load motor torque.

In another preferred embodiment of the invention, the variable frequency drive only comprises current sensors as sensors. Therefore, a standard variable frequency drive can be used for performing the presently described method, without any required hardware adaptations.

The invention is also directed at a variable frequency drive for controlling the speed of a reciprocating load motor. The variable frequency drive is programmed to perform the presently described method, comprising some or all of the presently described method steps. The variable frequency drive may be designed such that no waste heat is generated by the motor during a reciprocating load stroke and hence does not have to be dissipated by dedicated brake resistors. The variable frequency drive may be a diode rectifier front-end power converter.

BRIEF DESCRIPTION OF THE DRAWINGS

Further details and advantages of the invention are described with reference to the figures. The figures show.

DETAILED DESCRIPTION

Figure 1:
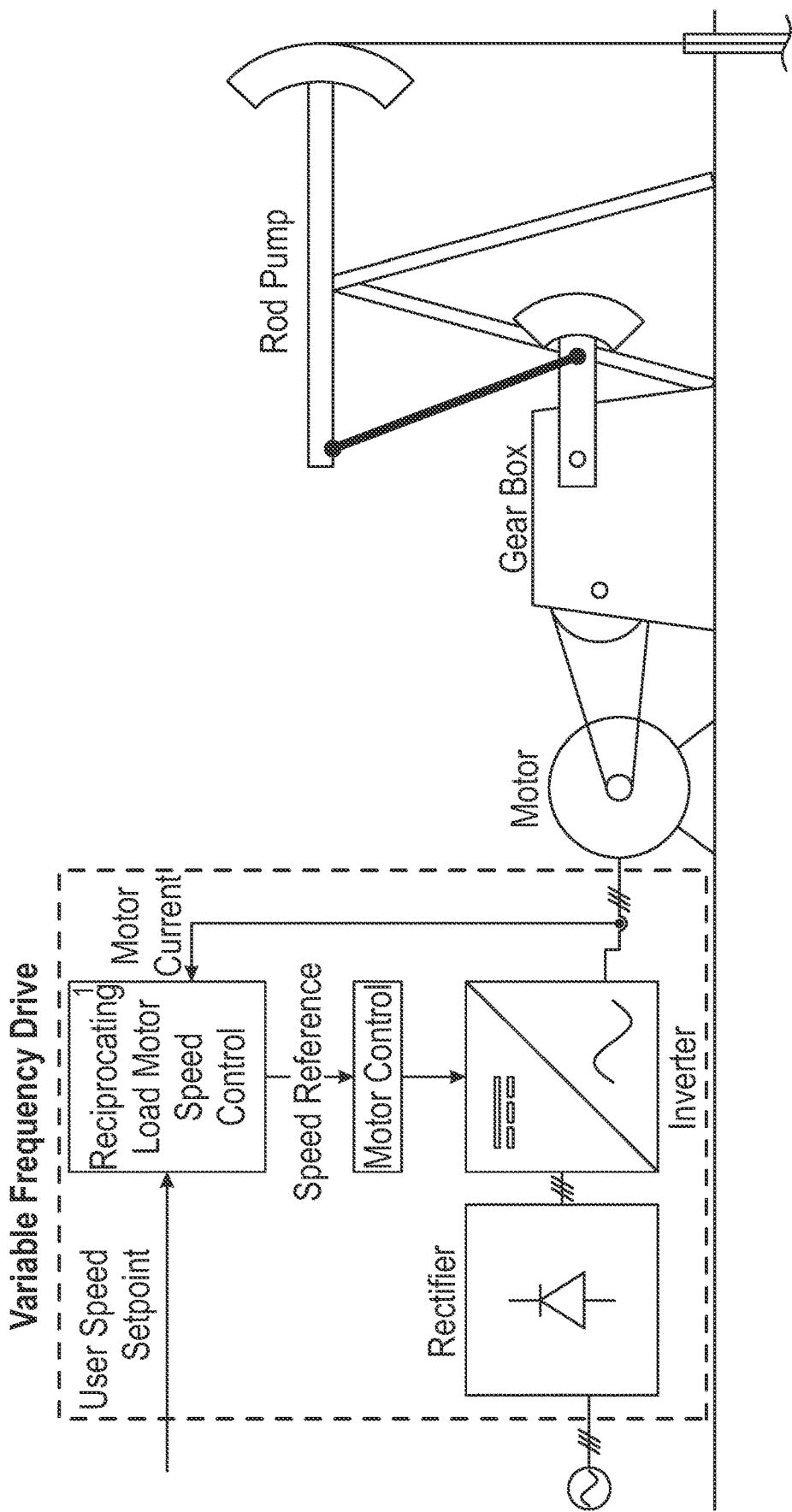
FIGS. 1, 2: schematic views of an application employing the presently described method.
Figure 2:
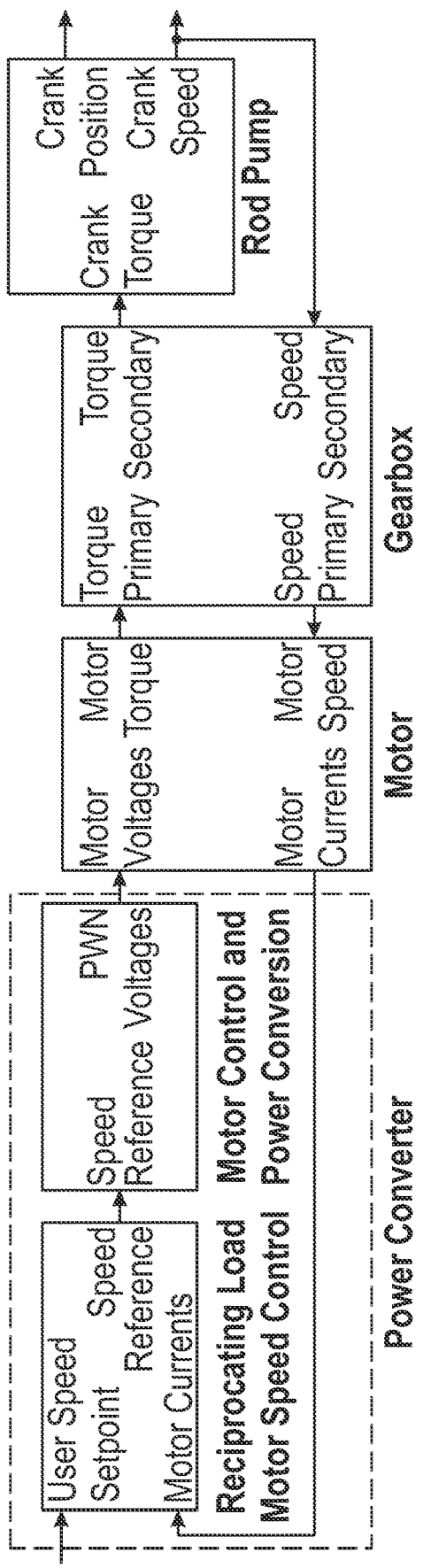

FIGS. 1 and 2 show schematic views of an application employing the presently described invention. The application may comprise a number of electrical and mechanical components. The application comprises a variable frequency drive which may be a power converter, a motor, a gearbox and a rod pump as a reciprocating load driven by the motor. The motor, the gearbox and the rod pump are coupled mechanically such that power can be transmitted from the motor to the rod pump.

The variable frequency drive provides an output signal to the motor for driving said motor. The application has the reciprocating load motor speed control integrated into the variable frequency drive. The reciprocating load motor speed control receives an input variable indicating the motor current or load, which is also indicative of the motor torque at any given time. A second input variables received by the drive is a user defined speed set-point which may be input by a user of the application. Based on the two input variables a reciprocating load motor speed control algorithm is provided at the drive for calculating the final speed reference, used by the variable frequency drive to output signals to the motor.

As both, the user defined speed set-point and the actual motor current, or load, are considered as input variables by the drive, the drive may control the motor torque to be kept positive during a complete load cycle of the reciprocating load, thereby avoiding an input of regenerated energy from the load to the motor and the drive.

The motor current indicative of the motor torque may be measured by at least one or exactly one current sensor, provided at or as part of the variable frequency drive.

It is possible to carry out the present invention by only measuring current values. Accordingly, the variable frequency drive may only comprise current sensors or only one current sensor, and no other sensor equipment.

Figure 3:
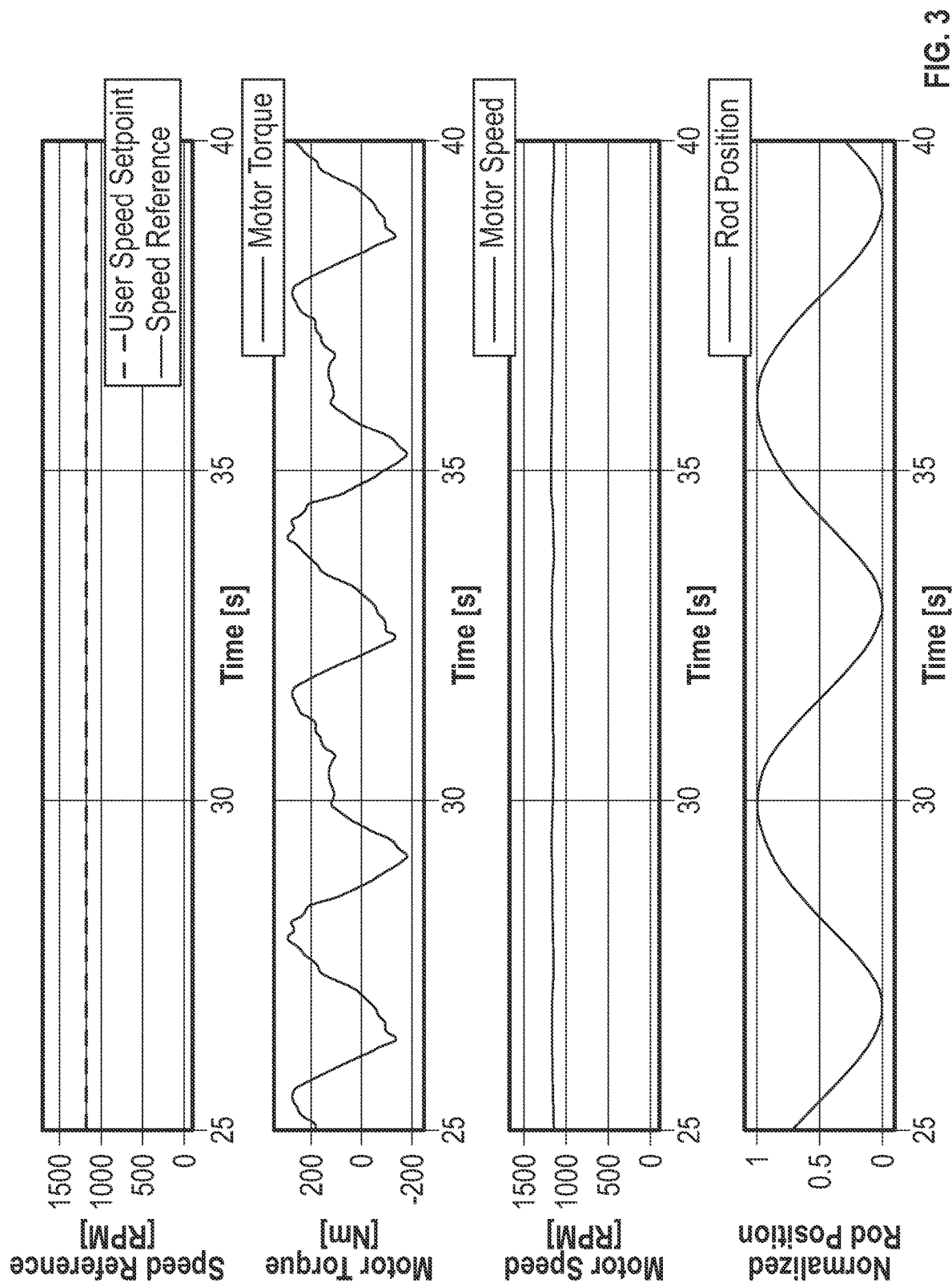
FIG. 3: graphs indicating the performance of state of the art applications.

FIG. 3 shows graphs indicating the performance of known state of the art applications, in which an electric motor is driving a reciprocating load. As indicated by the horizontal line in the central motor torque vs. time graph, negative torque may occur, wherein the reciprocating load effectively drives the motor, thereby creating regenerative power that may charge the DC-link of the variable frequency drive. In order to handle these reverse conditions, resistor braking is provided in applications known from the art.

Figure 4:
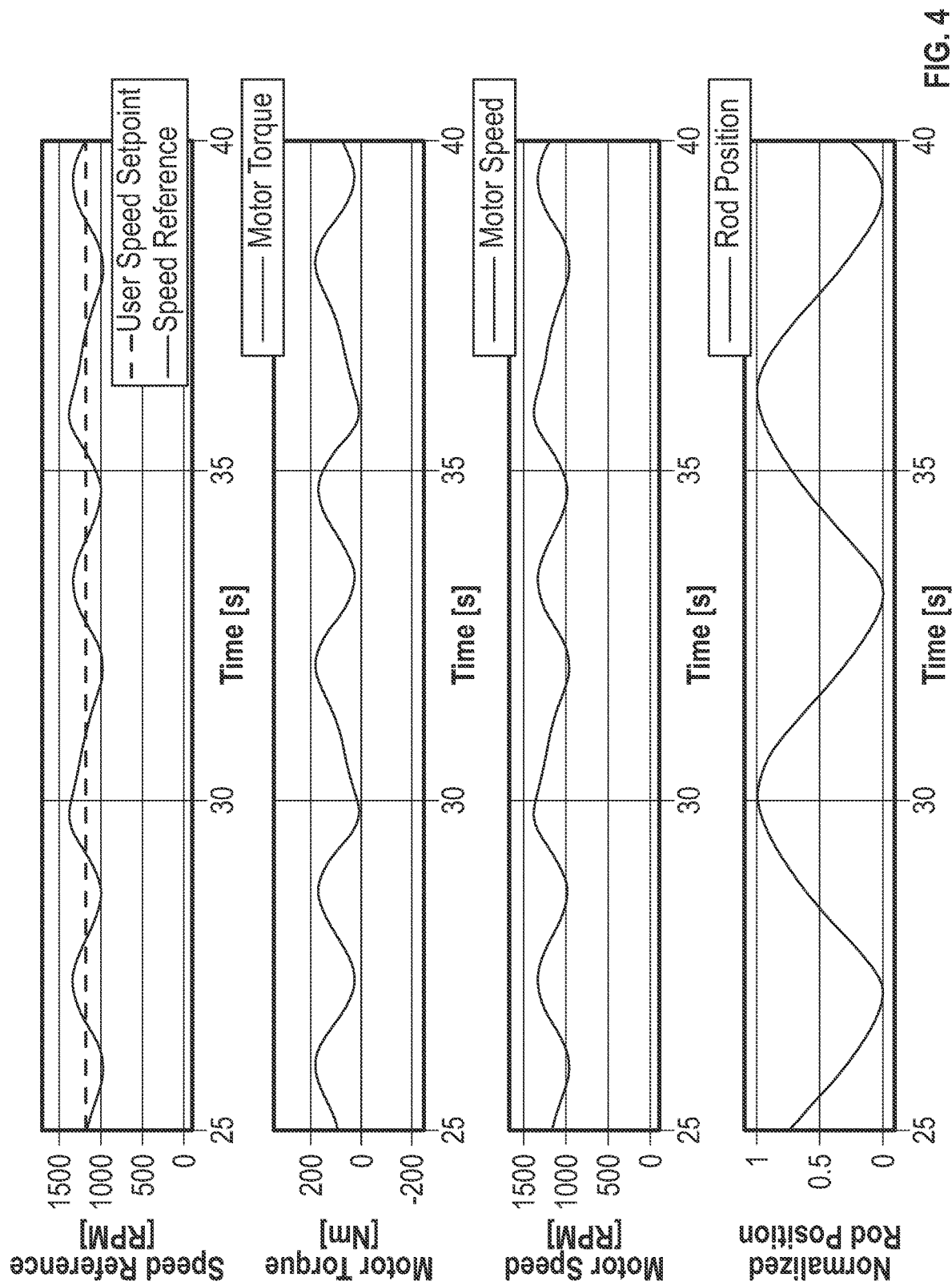
FIG. 4: graphs indicating the performance of an application employing the presently described invention.

FIG. 4 shows graphs indicating the performance of an application employing the presently described method and/or variable frequency drive. The top speed reference vs. time graph shows that while the known solutions provide for a fixed speed reference, the present invention provides a load dependent and therefore varying speed reference. The load dependent speed reference varies as a function of the torque from the reciprocating load to the motor.

The central motor torque vs. time graph shows that, according to the invention, no negative torque, i.e. torque from the reciprocating load to the motor is present anymore. Hence, the motor transmits net positive torque to the reciprocating load at all stages of its stroke, the corresponding curve is above the horizontal zero line.

Figure 5:
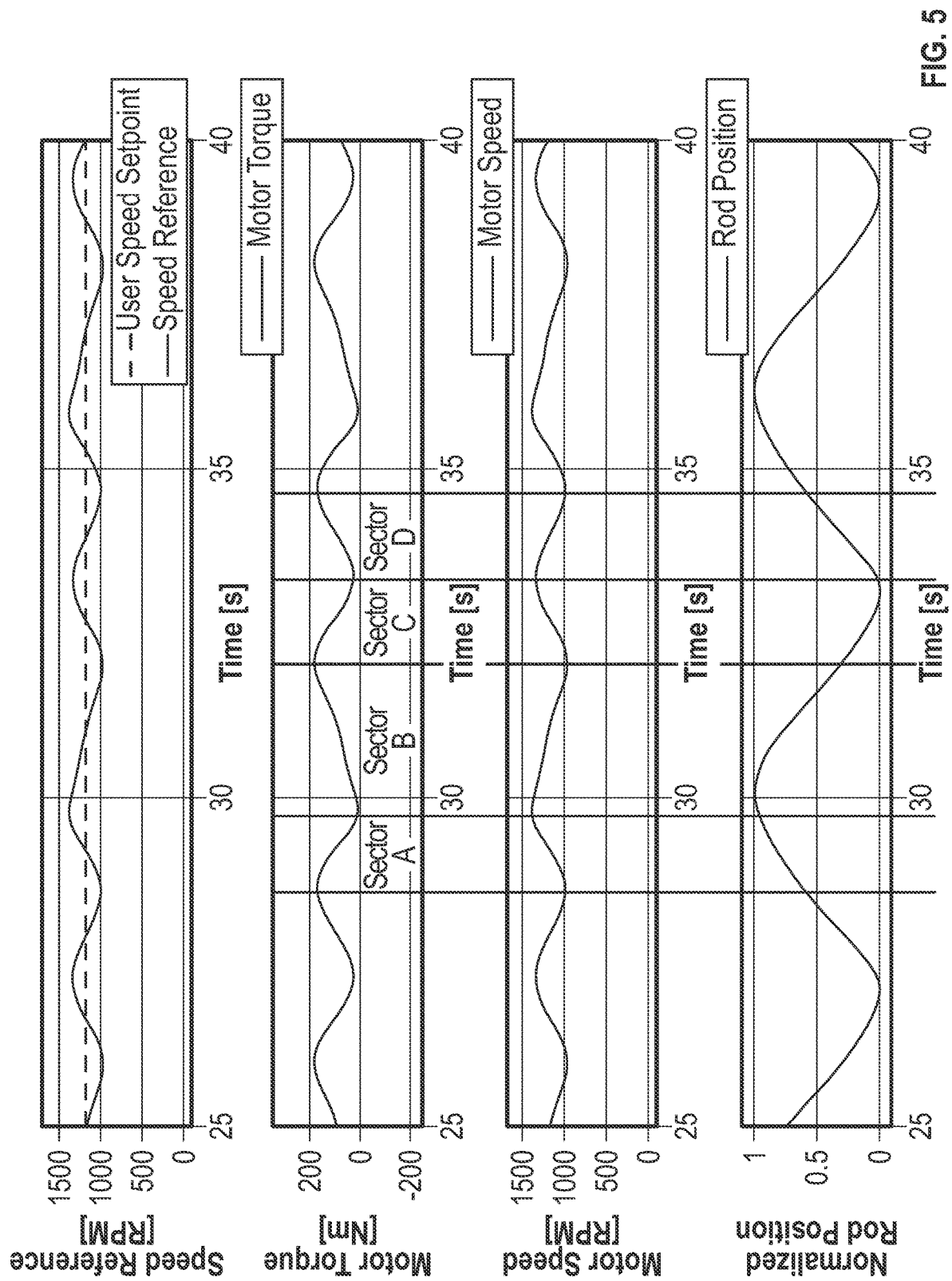
FIG. 5: graphs of motor torque and speed split into sections of half strokes.

FIG. 5 shows graphs split into sections with focus on motor torque. The four sections Sector A, Sector B, Sector C, Sector D, are half stroke torque data of the reciprocating load to the motor.

In Sector A and Sector C a decreasing curve of torque and energy to drive the motor is required. The motor is speeding up at the end of Sector A and Sector C while the motor torque is kept positive to avoid regenerative energy, which would normally require brake resistors, which again is wasted heat and energy.

In Sector B and Sector D, an increasing curve of torque and energy to drive the motor is required. The motor is slowing down at the end of Sector B and Sector D to have a speed that when going into next sector, will not generate a negative torque which would normally require brake resistors and would be wasted heat and energy.

The invention claimed is:

1. A method for controlling the motor speed of a reciprocating load motor, comprising controlling the motor speed of the motor as a function of two input variables, namely a user defined speed set-point and a load dependent input variable, wherein the load dependent input variable is a function of the motor current;

wherein a variable frequency drive for controlling motor speed is provided for performing the method; and wherein the variable frequency drive only comprises current sensors as sensors for performing the method.

2. The method according to claim 1, wherein the method is implemented as a control algorithm in the variable frequency drive.

3. The method according to claim 1, wherein motor torque is kept positive during a complete cycle of the reciprocating load.

4. The method according to claim 2, wherein the control algorithm uses measured reciprocating load motor current value as the only load-dependent input.

5. The method according to claim 1, wherein the motor current is measured by at least one current sensor in the variable frequency drive.

6. The method according to claim 1, wherein the motor speed is proportional to momentum accumulated in the load driven by the motor.

7. The method according to claim 1, wherein reciprocating load motor torque is calculated from measured current flowing through the reciprocating load motor.

8. A variable frequency drive for controlling the motor speed of a reciprocating load motor, comprising a controller programmed to perform the following method:
controlling the motor speed as a function of two input variables, namely a user defined speed set-point and a load dependent input variable;
wherein the load dependent input variable is a function of the motor current;
wherein the variable frequency drive only comprises current sensors as sensors.

9. The method according to claim 6, wherein the momentum accumulated in the load driven by the motor is accumulated in a shaft, crankshaft, and/or a gearbox.

10. The variable frequency drive according to claim 8, wherein the controller is programmed to perform the method such that no accumulated waste heat is generated by the motor during a reciprocating load stroke and hence does not have to be dissipated by dedicated brake resistors.

* * * * *